Patented Mar. 15, 1932

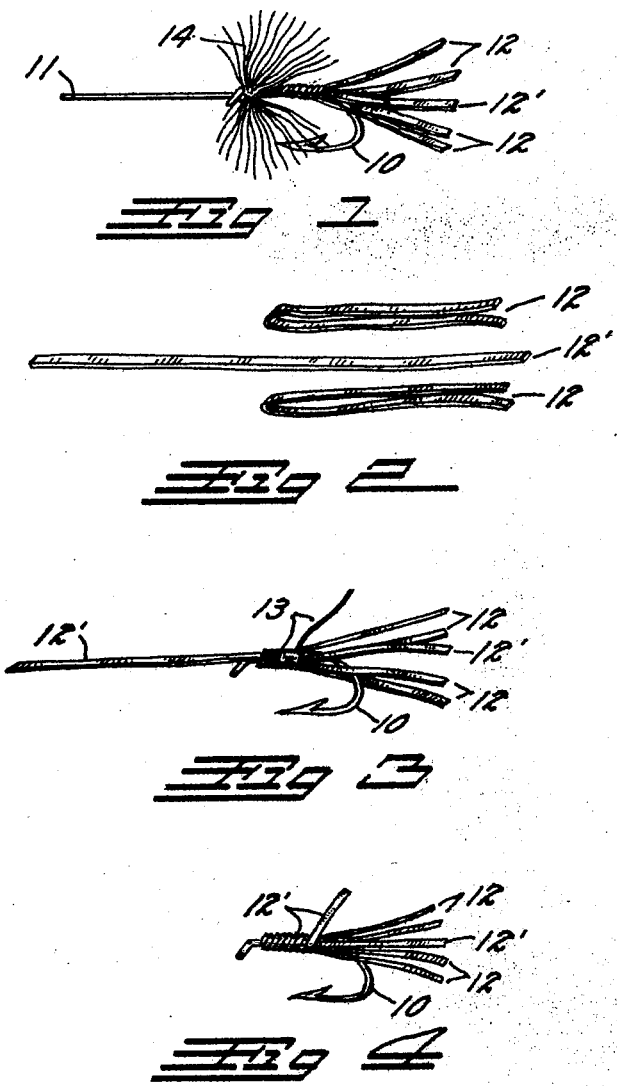

1,849,899

UNITED STATES PATENT OFFICE

STANLEY M. WRIGHT AND ANDREW D. McGILL, OF DENVER, COLORADO

FISHING FLY

Application filed March 16, 1931. Serial No. 522,882.

This invention relates to a fish lure. It is well known that fish are antagonistic to anything that sparkles or glitters in the water. This peculiarity has made such lures as metallic spinners and spoons successful. There are, however, certain classes of fishing to which spinners and spoons are not adaptable and where the most satisfactory results are obtained by means of artificial flies. The principal object of this invention is to provide an artificial fly with means for producing a brilliant and scintillating effect similar to that of a spinner or spoon.

Another object of the invention is to so construct and incorporate the means for producing the brilliant, scintillating effect in the fly that it will not interfere with the ordinary uses to which a fishing fly is put.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

The drawings illustrate enlarged views of the improved fly.

Fig. 1 is a side elevation thereof.

Fig. 2 is a detail view illustrating the type of metallic strips employed with the fly.

Fig. 3 illustrates the first step of tying the metallic strips in place.

Fig. 4 illustrates the second step employed for attaching the metallic strips.

Throughout the drawings a typical fish hook of any desired variety or type is illustrated at 10, preferably attached to a gut leader 11.

The glittering effect characteristic of this invention is obtained by the use of flat, metallic blades or strips 12, which are formed from very thin strips of sheet metal having a brilliant luster. Any desired type of metal could be employed which would not be too brittle, fragile, or stiff. It is preferred to use thin copper strips plated with gold, silver, nickle, or the like and highly polished. The strips are preferably lacquered to preserve the polish. This produces a soft flexible blade which will not interfere in any way with the fish striking the hook.

The blades can be secured to the hook in any desired manner. The preferred method of securing them, however, is illustrated in the drawings, wherein three strips of metal are employed as shown in Fig. 2, two of these strips are bent back upon themselves as illustrated at 12 and one of them is left extended its full length, as illustrated at 12'. The three strips are laid along the shank of the hook 10 and then are wrapped thereon by means of a thread 13. The thread is then entirely concealed by wrapping the forwardly projecting portion of the strip 12' about it, as shown in Fig. 4, and firmly tying or otherwise securing the extremity. The hook can be provided with any of the usual hackles 14, if desired, and the leader 11 tied thereto.

In use, the strips 12, owing to their soft metal, become wrinkled and irregularly dented, thus producing a multitude of reflecting surfaces at an infinite number of angles. These surfaces catch and reflect the light in an infinite number of radiating rays which produce a scintillating, glistening effect as the fly is moved through the water. This effect has been found to be particularly antagonizing and attractive to the fish and produces a highly efficient fish lure.

In order to prevent the hook 10 from being conspicuous it has been found highly desirable to plate the hook with a metal corresponding to the plating upon the strips 12.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A fish lure comprising: a hook and a series of metallic blades secured at their one extremity to said hook and projecting at a variety of angles therefrom.

2. A fishing fly comprising: a hook; a series of metallic blades; a flexible medium tied about said series and about said hook so as to secure the former in place thereon, the free extremities of said blades projecting rearwardly from said hook to form a divergent tail; and a metallic strip wound about said flexible medium so as to protect the latter and maintain it in place.

3. A fish lure comprising: a hook; a plurality of metal strips bent back upon themselves so as to form looped extremities; another metallic strip; a thread wrapped about said strips so as to tie said looped extremities of said first strip and the mid portion of said other strip to said hook so that the free extremities of all of said strips will project rearwardly from said hook to form a flaring tail, the forward extremity of said other strip being wrapped about said thread so as to conceal the latter.

In testimony whereof, we affix our signatures.

STANLEY M. WRIGHT.
ANDREW D. McGILL.